United States Patent
Mori et al.

(10) Patent No.: US 8,881,057 B2
(45) Date of Patent: Nov. 4, 2014

(54) METHODS AND APPARATUS TO DISPLAY MOBILE DEVICE CONTEXTS

(75) Inventors: Robert Mori, Palo Alto, CA (US); Curtis Jyun Sasaki, Sunnyvale, CA (US); Bradley Michael Marks, Toronto (CA); Siamak Sartipi, Waterloo (CA); Bhavuk Kaul, San Francisco, CA (US); Nedim Fresko, San Francisco, CA (US); Carol C. Wu, Palo Alto, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 302 days.

(21) Appl. No.: 12/974,376

(22) Filed: Dec. 21, 2010

(65) Prior Publication Data
US 2012/0117499 A1    May 10, 2012

Related U.S. Application Data

(60) Provisional application No. 61/411,739, filed on Nov. 9, 2010.

(51) Int. Cl.
*G06F 3/048* (2013.01)
*H04M 1/725* (2006.01)
*G06F 3/0481* (2013.01)

(52) U.S. Cl.
CPC ...... *H04M 1/72583* (2013.01); *H04M 1/72569* (2013.01); *H04M 1/72572* (2013.01); *G06F 3/0481* (2013.01)
USPC ........................... 715/811; 715/810; 715/815

(58) Field of Classification Search
CPC .................................................... G06F 3/0481
USPC .......................................... 715/810, 817, 815
See application file for complete search history.

(56) References Cited

U.S. PATENT DOCUMENTS 6,400,996 B1 * 6/2002 Hoffberg et al. ................ 700/83
6,750,883 B1    6/2004 Parupudi et al.
(Continued)

FOREIGN PATENT DOCUMENTS

EP    1465392 A2    10/2004

OTHER PUBLICATIONS

Gsmarena Team, HTC Desire review: A desire come true, HTC Sense likes it on big screen, internet article, http://www.gsmarena.com/htc_desire-review-468p3.php, Apr. 16, 2010, 5 pages.

(Continued)

*Primary Examiner* — William Bashore
*Assistant Examiner* — Gregory A Distefano
(74) *Attorney, Agent, or Firm* — Hanley, Flight & Zimmerman, LLC

(57) ABSTRACT

Example methods and apparatus to display mobile device contexts are disclosed. An example method includes displaying a first context in a user interface of a mobile device based on first device platform information, the first context including a first arrangement of information, graphics, and application icons that are associated with the first device platform information, determining that second device platform information received after the first device platform information corresponds to a second context, the second context being different from the first context and including a second arrangement of information, graphics, and applications that are associated with the second device platform information, and displaying the second context in the user interface replacing the first context without prompting a user of the mobile device.

20 Claims, 9 Drawing Sheets

(56) References Cited

U.S. PATENT DOCUMENTS

| | | | |
|---|---|---|---|
| 6,850,252 B1* | 2/2005 | Hoffberg | 715/716 |
| 6,912,386 B1 | 6/2005 | Himberg et al. | |
| 7,221,939 B2 | 5/2007 | Ylitalo et al. | |
| 7,813,488 B2 | 10/2010 | Kozdon et al. | |
| 2003/0063125 A1* | 4/2003 | Miyajima et al. | 345/781 |
| 2005/0071429 A1 | 3/2005 | Hettish et al. | |
| 2006/0005156 A1 | 1/2006 | Korpipaa et al. | |
| 2006/0218112 A1* | 9/2006 | Van De Sluis et al. | 707/1 |
| 2008/0005679 A1* | 1/2008 | Rimas-Ribikauskas et al. | 715/745 |
| 2008/0040488 A1 | 2/2008 | Gupta et al. | |
| 2008/0125103 A1 | 5/2008 | Mock | |
| 2009/0129739 A1* | 5/2009 | Kato et al. | 386/52 |
| 2009/0256806 A1 | 10/2009 | Chen | |
| 2009/0300525 A1 | 12/2009 | Jolliff et al. | |
| 2009/0313645 A1 | 12/2009 | Sathish et al. | |
| 2010/0069103 A1 | 3/2010 | Karmarkar et al. | |
| 2010/0312760 A1* | 12/2010 | Nykanen et al. | 707/705 |
| 2011/0072492 A1* | 3/2011 | Mohler et al. | 726/3 |

OTHER PUBLICATIONS

Locale Feedback Forum, Integrate with Scenes in HTC Sense, internet article, http://feedback.twofortyfouram.com/forums/5655-locale-feedback/suggestions/282012-integrate-with-scenes-in-htc-sense, retrieved from the internet on Dec. 21, 2010, 2 pages.

Android Central, Review: Verizon HTC Droid Incredible, internet article, http://www.androidcentral.com/review-verizon-htc-droid-incredible, posted on Apr. 18, 2010, 19 pages.

Canadian Intellectual Property Office, "Examiner Report", issued in connection with Canadian Patent Application No. 2,757,649 on Jun. 18, 2013 (3 pages).

European Patent Office, "European Search Report", issued in connection with European Patent Application No. 10196355.1 on Feb. 14, 2012 (6 pages).

Canadian Intellectual Property Office, "Examiner's Report," issued in connection with Application No. 2,757,649, Aug. 13, 2014, 3 pages.

* cited by examiner

METHODS AND APPARATUS TO DISPLAY MOBILE DEVICE CONTEXTS

RELATED APPLICATION

This application claims the benefit of U.S. Provisional Application No. 61/411,739 filed Nov. 9, 2010, the entirety of which is incorporated by reference.

FIELD OF THE DISCLOSURE

This disclosure relates generally to mobile devices and, more particularly, to methods and apparatus to display mobile device contexts.

BACKGROUND

Mobile devices display information to a user via a user interface. The user interface includes graphical and/or pictorial representations of information formatted based on aesthetics. In some instances, a user may configure how the information is displayed. The display of the user interface including, for example, graphical and/or pictorial representations of information is referred to as a context of the user interface. Contexts can show different features, functions, and/or applications that are selected to be displayed when a user views a user interface of a mobile device. In some examples, a context of a user interface may display a date, a time, missed calls, new voicemails, expected battery life, wireless signal reception strength, and/or a list of frequently used applications (e.g., Facebook, Twitter, sports scores, traffic, etc.). Further, a context of a user interface may include a background image (e.g., a picture). In many instances, a user may edit, modify, and/or select which information is displayed within a context of a mobile device.

DETAILED DESCRIPTION

Figure 1:
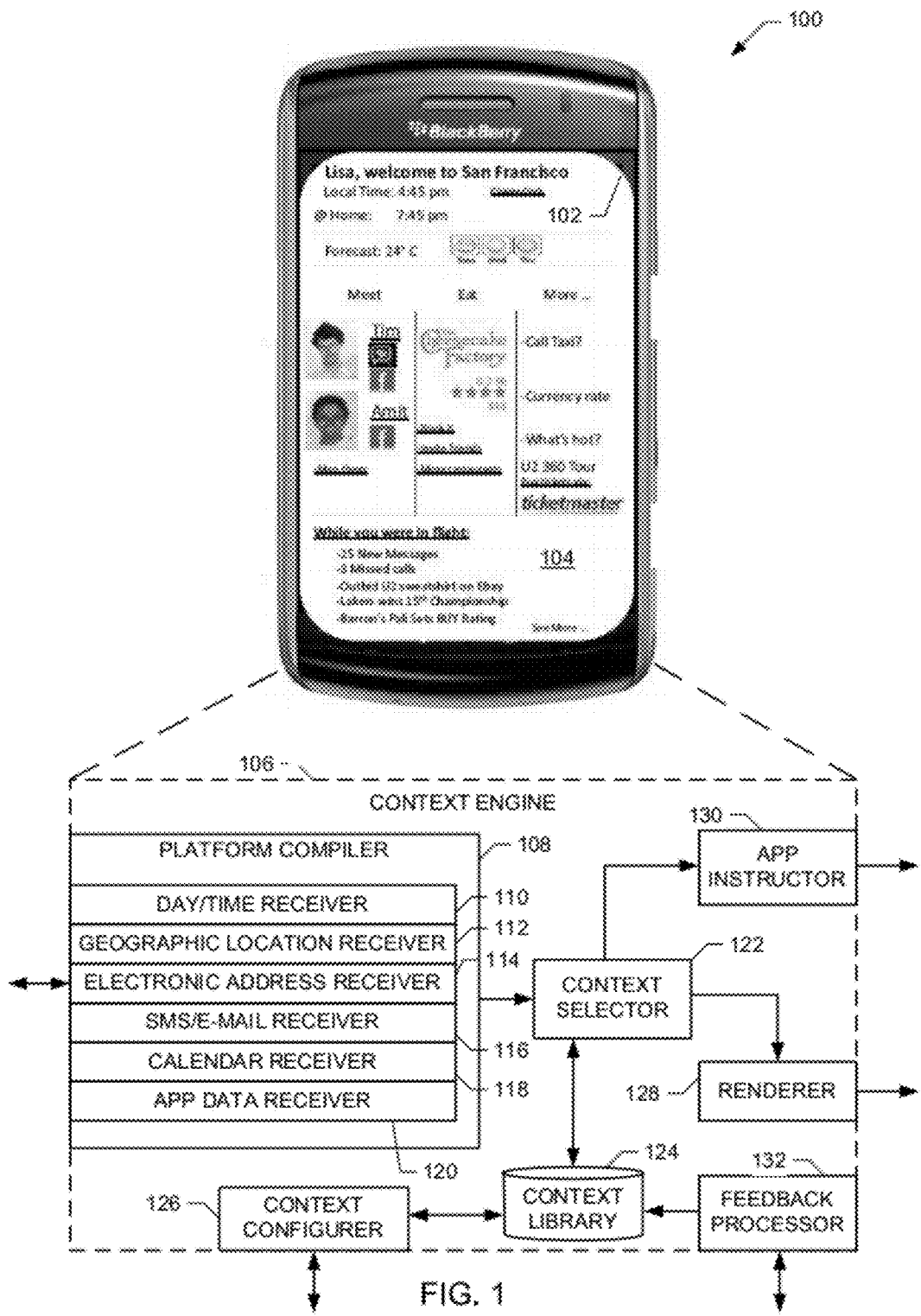
FIG. 1 shows a mobile device with a user interface that displays a travel context, which is managed and/or configured by a context engine.

Methods and apparatus to display mobile device contexts are described herein. Although the following discloses example methods and apparatus including, among other components, software executed on hardware, it should be noted that such methods and apparatus are merely illustrative and should not be considered as limiting. For example, it is contemplated that any or all of these hardware and software components could be implemented exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

Currently, many known mobile devices display a user interface. The user interface includes graphical and/or pictorial representations of information formatted based on preferences of a user and/or aesthetics. The combination of the graphical and/or pictorial representations of information with shading and/or pictures creates a context for the user interface. Each type of context shows different features, functions, and/or applications that a user selects to be displayed when the user views the user interface of a mobile device. For example, a context of a user interface may display a date, a time, missed calls, new voicemails, expected battery life, wireless signal reception strength, and a list of frequently used applications (e.g., Facebook, Twitter, sports scores, traffic, etc.). Additionally, a context of a user interface may include a background image (e.g., a picture) selected by the user. A user may edit and/or modify the information displayed within a context of a mobile device. However, in many known instances, a context of a mobile device does not change unless specified by a user.

Some known mobile devices have more than one selectable context. For example, when a user is at work, the user may configure a user interface to display a work context by selecting to display in the user interface a stock ticker and an e-mail application. Similarly, the user may configure the user interface for an evening context by selecting to display in the user interface restaurant listings, updates from friends via a social networking application, and a map application. In these examples, a user may create and store different contexts. To navigate between contexts, a user manually selects the desired user interface context based on the situation and/or the user's preferences.

The example methods and apparatus described herein automatically change and/or suggest a context (or between contexts) of a user interface of a mobile device based on detected information. To automatically, change a context, the example methods and apparatus described herein compare device platform information from a mobile device and associated application information with context setting rules and/or definitions provided by a user to determine which context is to be displayed. In this manner, the example methods and apparatus described herein change a context displayed on a mobile device based on a detected environment of a user, thereby adapting a mobile device to ever changing contexts of the user.

In one example, to identify a context to suggest and/or display, the example methods and apparatus calculate a likelihood (e.g., a probability, a weight, etc.) that identified device platform information and application information match a context created by a user. Device platform information includes, for example, a current day, a current time, a detected geographic location (e.g., global positioning system (GPS) data), an electronic address (e.g., a Wi-Fi service set identifier (SSID)), and/or any other information that is detected by a mobile device. Application information includes, for example, appointments in a calendar application, events specified in an e-mail or short message service (SMS) application, user specific information in a social media application, and/or any other information provided by an application on a mobile device.

In some examples, the methods and apparatus described herein update a likelihood that a user would like to view a specific context based on feedback from the user during manual context changes. For example, if a user changes a user interface of a mobile device from a work context to a leisure context, the example methods and apparatus determine any relevant device platform information and/or application information, reduce a likelihood of the work context based on the identified information and increase a likelihood of the leisure context based on the identified information. In some of these examples, the methods and apparatus may utilize a timer and/or other logic to determine if a user switches contexts temporarily or for a relatively longer period of time. In these examples, the methods and apparatus may withhold from updating the likelihoods unless a timer exceeds a predefined threshold.

FIG. 1 shows a mobile device 100 with a user interface 102 that displays a travel context 104, which is managed and/or configured by a context engine 106. The example mobile device 100 may include, for example, a mobile station, user endpoint equipment, a personal digital assistant (PDA), a smartphone, a laptop, a computing pad, etc. The mobile device 100 may conform to any wireless communication protocol including, for example, Global System for Mobile Communications (GSM), Personal Communications Service (PCS), Digital Advanced Mobile Phone Service (D-AMPS), 802.11 wireless local area network (WLAN), etc. The example mobile device 100 is communicatively coupled to at least one service provide and/or network provider to receive and/or transmit data.

The example user interface 102 enables a user to interface with the wireless device 100. In the illustrated example, the user interface 102 includes a touch-sensitive display screen. A user may manipulate the display screen to select features, functions, and/or applications displayed within the user interface 102. In other examples, the user interface 102 may include buttons, keypads, track balls, and/or any other user interface input detection peripherals. The example user interface 102 displays graphical and/or pictorial representations of information formatted to be displayed within an area defined by the mobile device 100. While the example user interface 102 displays the travel context 104, in other examples, the user interface 102 may display other types of contexts based on a detected environment of a user.

The example travel context 104 of FIG. 1 displays information that may be relevant to a user upon arriving in a city. In this example, the travel context shows information that may be relevant to a user upon landing at San Francisco International Airport. This information includes a title (e.g., "Lisa, Welcome to San Francisco"), a local time (e.g., "Local Time 4:45 pm"), a three day weather forecast for San Francisco (e.g., "Forecast), Facebook friends that live in the area (e.g., "Meet"), favorite restaurants in the area (e.g., "Eat"), local information (e.g., ("More . . . "), and missed messages (e.g., "While you were in flight:"). The formatting and display of this information may be configured by the user for the travel context 104. In other examples, a user may select other features, functions, and/or applications to display in the user interface 102 for the travel context 104.

To manage the display of the travel context 104 within the user interface 102, the example mobile device 100 of FIG. 1 includes the context engine 106. The example context engine 106 enables a user to create and/or configure different contexts (e.g., the travel context 104). The example context engine 106 also displays a context based on detected device platform information and application information, instructs which applications are to be displayed for which contexts, and updates likelihoods of suggesting and/or displaying a context based on feedback from a user. The example context engine 106 may be included as a separate application specific integrated circuit (ASIC) within the mobile device 100. In other examples, the context engine 106 may be implemented by one or more microcontrollers, processors, digital controllers, and/or any other components for processing, managing, and/or displaying data within the mobile device 100.

To receive device platform information and/or application information, the example context engine 106 of FIG. 1 includes a platform compiler 108. The example platform compiler 108 includes receivers 110-120 that interface between the context engine 106 and the mobile device 100 and/or applications. The platform compiler 108 compiles information received from the receivers 110-120 and forwards the information to a context selector 122. In some examples, the platform compiler 108 may parse the received information for relevant information, thereby discarding irrelevant information not used by the context selector 122. Additionally, the platform compiler 108 may instruct the receivers 110-120 to request information at a particular time period from the mobile device 100 and/or applications. The platform compiler 108 may then aggregate the information received by the receivers 110-120 for the time period.

The example day/time receiver 110 receives current day and/or time information (e.g., device platform information) from the mobile device 100. For example, the day/time receiver 110 may be communicatively coupled to a clock of the mobile device 100. Alternatively, the day/time receiver 110 may receive clock information via any other manner (e.g., GPS). The current day and time information may include a day of the week, a time of the day, a month of a year, and a year. The day/time receiver 110 may receive periodic updates from the mobile device 100 or, alternatively, may poll the mobile device for current day and time information.

The example platform compiler 108 includes the geographic location receiver 112 to receive physical location information (e.g., device platform information) from the mobile device 100. The physical location information identifies a current (and/or last detected) geographic location of the mobile device and can include, for example, GPS data, a physical address, coordinates (e.g., latitude and longitude), altitude, and/or any other information that may identify a location of the mobile device 100. In examples where GPS data is received, the geographic location receiver 112 may be communicatively coupled to a GPS receiver of the mobile device 100.

The electronic address receiver 114 receives electronic address information (e.g., device platform information) from the mobile device 100. The electronic address information may include, for example, an Internet Protocol (IP) address assigned to the mobile device by a service provider. Electronic address information may also include a media access control (MAC) address of the mobile device 100, a platform indicator number for the mobile device 100, a Blackberry identifier (ID), and/or any other electronic address that is used to route data to the mobile device 100. Electronic address information may further include electronic addresses of wireless devices within proximity of an access point (e.g., a Wi-Fi SSID). In some examples, the electronic address receiver 114 receives periodic updates of an electronic address. In other examples, the electronic address receiver 114 queries the mobile device 100 for electronic address information.

The example platform compiler 108 of the illustrated example includes the SMS/e-mail receiver 116 to search any SMS, text message, blog, text feed, and/or e-mail applications for application information. In other examples, the SMS/e- mail receiver 116 may be configured to receive messages received and/or transmitted by a user via SMS, text message, blog, text feed, and/or e-mail applications. The SMS/e-mail receiver 116 may scan the messages for indications of event information, geographic information, and/or any other information that may be relevant for determining a context to display.

The example calendar receiver 118 of the illustrated example accesses a calendar application on the mobile device 100 to search for any entries that may identify event information (e.g., application information). In these examples, the calendar receiver 118 may identify event information by scanning a calendar application on the mobile device 100 for any relatively upcoming scheduled events and searching for any geographic information, meeting information, and/or specified tasks a user of the mobile device 100 is to perform. In other examples, a calendar application may transmit entries to the calendar receiver 118 as the entries are scheduled to occur. For example, the calendar receiver 118 may detect an upcoming calendar entry that specifies a user is to have a meeting in San Francisco in ten hours (based on a name of the contact in the meeting, a company name for the meeting, or a specified location for the meeting). The context engine 106 may use this information to determine that the travel context 104 is to be displayed at the time of the scheduled meeting.

The example platform compiler 108 of the illustrated example also includes the app data receiver 120 to receive application information from any other application operating on the mobile device 100. The app data receiver 120 may receive any type of information that may be relevant in determining a context. For example, the app data receiver 120 may receive status updates from a social networking application that may be used by the context engine 106 to determine a context to display. In another example, a booked reservation from a restaurant reservation application may be used by the context engine 106 to determine a context to display. While the app data receiver 120 is shown as a single receiver, in other examples, the app data receiver 120 may be partitioned into additional receivers for each application that provides information to the platform compiler 108.

The example context selector 122 of the illustrated example selects a context to display within the user interface 102 of the mobile device 100. The context selector 122 uses the information compiled by the platform compiler 108 to determine which context is to be displayed. The example context selector 122 selects a context by matching compiled device platform and/or application information to rules and/or definitions of contexts and identifying which context has the most matching rules and/or definitions. In some examples, the context selector 122 matches the information to heuristics, rules and/or definitions that have assigned weights and/or probabilities (e.g., likelihood that a context is to be displayed). In these examples, the context selector 122 sums the weights and/or multiplies the probabilities for each of the rules and/or definitions to determine a total weight and/or probability for each context. The example context selector 122 may then select the context that has relatively the greatest weight and/or probability.

In an example, the context selector 122 of FIG. 1 may receive '3:04 P.M./Friday May 14, 2011' day and time information, '1075 California Street, San Francisco, Calif.' geographic location information, 'Meeting with Tim/Research In Motion/4:00 P.M. June 15' calendar event information, and '123.33.44.555' electronic address information (e.g., device platform and application information). In this example, the context selector 122 determines there are four possible contexts (e.g., Travel, Work, Leisure, and Morning) that have rules defined for time, date, and geographic location. The context selector 122 may also determine that the Travel context (e.g., the travel context 104) is currently displayed. For each context, the context selector 122 calculates a weight for each rule based on the device platform and/or application information.

In this example, the work context may have a time rule that specifies a time of 9:00 A.M. to 5:00 P.M., a date rule that specifies days of the week of Monday through Friday, and a geographic location rule that specifies the work context is to be displayed within five miles of the address 150 South Wacker Street, Chicago, Ill. 60606. Similarly, the travel context may have a time rule that specifies a time of 9:00 A.M. to 6:00 A.M., a date rule that specifies days of the week of Monday through Sunday, and a geographic location rule that specifies the travel context is to be displayed when the mobile device 100 is greater than 100 miles from the work address of 150 South Wacker Street, Chicago, Ill. 60606. Each of these rules may be assigned a weight and/or probability upon configuring the respective context.

To identify a weight for the rules, the context selector 122 determines if the currently received device platform and application information match each of the rules. In this example, the context selector 122 determines that the '3:04 P.M.' time information matches the 9:00 A.M. to 5:00 P.M. time rule of the Work context, which has an assigned 0.8 weight. Additionally, the context selector 122 determines that the 'Friday May 14, 2011' date matches the date rule, which has a 0.7 weight. Additionally, the context selector 122 determines that the 'San Francisco' geographic location information does not match the Chicago, Ill. rule, indicating a 0.0 weight. Further, the context selector 122 may use the text in the calendar event information to infer that the words 'Meeting' and 'Research in Motion' are associated with the Work Context. Based on this inference, the context selector 122 may add an additional 0.6 weight to calculate a total Work context weight of 2.1. The example context selector 122 may determine the additional 0.6 weight based on an algorithm and/or rule set that specifies weights based on types of text and/or an amount of text from application information that matches and/or corresponds to a context.

Similarly, the context selector 122 identifies weights for the other contexts based on matching device platform and application information. In this example, because all of the Travel context rules match the received device platform and application information, the context selector 122 may calculate a total weight of 2.0 for the Travel context. Further, because not all of the rules for the Leisure and Morning contexts match the received device platform and application information, the context selector 122 calculates a total Leisure context weight of 0.8 and a total Morning context weight of 0.7.

The example context selector 122 of this example then identifies that the Work context has the highest calculated weight (e.g., 2.1) and transmits instructions to the context engine 106 to display the Work context. In this specific example, the application information from the calendar enabled the context selector 122 to determine that while the user of the mobile device 100 may be away from the office, the user is in a work environment (e.g., a work context) and a work context should replace the travel context 104 displayed within the user interface 102. In other words, the context selector 122 uses detected device platform and/or application information to determine a contextual environment of the user to select the appropriate context.

While this example uses weights, in other examples, the context selector 122 may utilize probabilities, likelihoods, and/or any other means of determining a context to display. In yet other examples, the context selector 122 may implement a state machine that determines a context based on a currently displayed context that uses weights and/or probabilities of rules to transition to a new context based on the received information from the platform compiler 108. In these examples, the context selector 122 identifies a currently selected context and uses the state machine to determine which of the contexts can be transitioned to from the current context. The context selector 122 may then calculate a total weight and/or probability for each available context and select the context with the relatively greatest weight and/or probability.

In addition to selecting which is to be displayed, the example context selector 122 may combine features, functions, and/or applications of a currently displayed context with a context that is to be displayed (e.g., combine two or more contexts). The example context selector 122 of the illustrated example may combine portions of contexts when the context selector 122 calculates two total weights of contexts that are relatively close in magnitude. In the example described above, because the weights of the Work context and the Travel context were similar (e.g., 2.1 weight for Work context and 2.0 weight for Travel context), the context selector 122 may display some applications of the Travel context (e.g., a flight application) within the Work context.

Further, the example context selector 122 of the illustrated example may display a prompt in the user interface 102 asking a user of the mobile device 100 is the use would like the context changed. If the user responds affirmatively to a context change, the context selector 122 changes to the selected context. If the user does not respond affirmatively to a context change, the context selector 122 continues to display the current context.

The example context selector 122 of FIG. 1 accesses contexts from a context library 124. The example context library 124 stores contexts created by a user of the mobile device 100 and/or default contexts created by a manufacturer and/or developer of the mobile device 100. The example context library 124 may be implemented by Electronically Erasable Programmable Read-Only Memory (EEPROM), Random Access Memory (RAM), Read-Only Memory (ROM), and/or any other type of memory.

To create, modify, edit, add, and/or delete contexts, the example context engine 106 of the illustrated example includes a context configurer 126. The example context configurer 126 manages a display of menus and/or data fields to enable a user to create and/or modify a context. The example context configurer 126 receives inputs from a user selecting options on a menu and uses the inputs to generate a context. In many instances, the menus provided by the context configurer 126 enable a user to specify rules for when a context is to be displayed.

For example, to create a context, a user specifies times of a day, days of a week, particular geographic locations, and/or other configuration information that defines when a context is to be displayed. The context configurer 126 creates a file for the context (e.g., a context file) and stores this configuration information as a rule set. The rule set may be included within the file as metadata. Alternatively, the configuration information may be stored to the file as a list of rules and/or definitions.

The example context configurer 126 may also assign weights and/or probabilities to rules defined by a user. In some examples, the weights and/or probabilities may be pre-defined by a manufacturer of the mobile device 100. For example, all rules associated with a time of day are assigned a weight of 0.7. In other examples, a user of the mobile device 100 may assign a weight and/or probability while creating a context. For examples, a menu to create a time of day rule may query a user how often the user expects to use a context during a specified time of day. Upon receiving a weight and/or probability, the context configurer 126 stores the weight and/or probability with the associated rule in the respective context file.

In addition to enabling a user to define when a context is to be displayed, the example context configurer 126 enables a user to specify display features of the context. The display features include, for example features, functions, applications, pictures, and/or shading that is to be displayed within the user interface 102 as a visual representation of the context (e.g., the displayed travel context 104). In some examples, the context configurer 126 enables a user to select which applications, features, and/or functions are to be displayed within a context. The context configurer 126 may also enable a user to arrange how graphical representations of the features, functions, and/or applications are to be presented within the user interface 102 (e.g., a specified arrangement of applications within the user interface 102). Further, the context configurer 126 may enable a user to select one or more pictures to display as a background of the user interface 102 for a specified context.

Based on the display factors received from a user, the context configurer 126 generates instructions within the corresponding context file that specify which features, functions and/or applications are to be accessed when the context is displayed. The instructions may also define physical locations within the user interface 102 where the features, functions and/or applications are to be displayed. The context configurer 126 may also create an instruction with a link to a picture and/or an imagine stored in a memory of the mobile device 100 that is to be displayed as a background image. After creating a file defining how a context is to be displayed, the context configurer 126 stores the file (e.g., the context) to the context library 124.

To display a selected context, the example context engine 106 of FIG. 1 includes a renderer 128. The example renderer 128 receives a selected context from the context selector 122 and renders the context for display via the user interface 102. In the illustrated example, the renderer 128 renders the travel context 104 for display. To render a context, the example renderer 128 reads a file associated with a context to determine how the graphical representations of features, functions, and/or applications are to be displayed within the user interface 102. The example renderer 128 may also access pictures and/or images from a memory location of the mobile device 100 that are referenced by a context file. Further, the renderer 128 may apply shading and/or any other imaging features specified by a user for the context. After rendering an image of the context, the example renderer 128 transmits the rendered image to the user interface 102 for display.

To instruct applications to operate within a selected context, the example context engine 106 of FIG. 1 includes an app instructor 130. The app instructor 130 may also instruct features and/or functions of the mobile device 100. The example app instructor 130 receives instructions from the context selector 122 regarding a selected context and corresponding applications. The context selector 122 may inform the app instructor 130 which applications are to be displayed within the context. The context selector 122 may also provide any relevant information that the app instructor 130 may provide to the applications to display within the context. After receiving instructions from the context selector 122, the app instructor 130 sends instructions to the appropriate applications within the mobile device 100. The instructions may cause the corresponding applications to operate. Additionally, the instructions may cause the applications to display information.

For example, the context selector 122 may instruct the app instructor 130 to open a social networking application, a restaurant review application, a weather application, an e-mail application, and a call status application (e.g., some of the applications displayed within the travel context 104). Additionally, the context selector 122 may transmit the current geographic location (e.g., San Francisco, Calif.) and the current time (e.g., 4:45 P.M.). The app instructor 130 then sends instructions to each of the applications with the geographic location and the current time. In response, for example, the social networking application displays friends within proximity of the geographic location, the restaurant application displays restaurants within proximity of the geographic location, and the weather application provides a forecast for the geographic location for the current time. In this manner, the example context engine 106 displays a context with applications, features, and/or functions that display relevant information to a user based on a detected environment of the user.

To adjust weights and/or probabilities of rules for contexts, the example context engine 106 includes a feedback processor 132. The example feedback processor 132 enables the context engine 106 to learn from past behaviors and/or uses of a user. To adjust a weight and/or probability, the feedback processor 132 determines if a user selects to view a context different from a currently displayed context. In some examples, the feedback processor 132 may receive an indication that a user selected a different context. In these examples, the feedback processor 132 determines which context was previously displayed and reduces weights and/or probabilities of rules of that context that match current device platform and/or application information. In this manner, the feedback processor 132 adjusts a likelihood that a user does not want to view a context at a current moment because the user selected a different context. In a similar manner, the feedback processor 132 determines which context was selected by the user and increases weights and/or probabilities of rules of that context that match current device platform and/or application information. In these examples, the feedback processor 132 may only adjust a weight and/or probability relatively slightly for each manual selection of a context by a user. In this manner, the more times a user manually selects a context, the more the feedback processor 132 adjusts the weights and/or probabilities so that at some point the context engine 106 automatically displays the desired context.

In some examples, the feedback processor 132 may include a timer that is activated when a user selects to view a work Context instead of the currently displayed travel context 104. If the user selects the travel context 104 before the timer has reached a predefined threshold, the feedback processor 132 does not adjust weights and/or probabilities for rules associated with the work context and the travel context 104. In this manner, the threshold prevents probabilities and/or weights from being changed by the feedback processor 132 when a user only temporarily selects a different context.

While the example context engine 106 has been illustrated in FIG. 1, one or more of the servers, platforms, interfaces, data structures, elements, processes and/or devices illustrated in FIG. 1 may be combined, divided, re-arranged, omitted, eliminated and/or implemented in any way. Further, the example platform compiler 108, the example receivers 110-120, the example context selector 122, the example context library 124, the example context configurer 126, the example renderer 128, the example app instructor 130, the example feedback processor 132 and/or, more generally, the example context engine 106 may be implemented by hardware, software, firmware and/or any combination of hardware, software and/or firmware. Thus, for example, any of the example platform compiler 108, the example receivers 110-120, the example context selector 122, the example context library 124, the example context configurer 126, the example renderer 128, the example app instructor 130, the example feedback processor 132 and/or, more generally, the example context engine 106 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example platform compiler 108, the example receivers 110-120, the example context selector 122, the example context library 124, the example context configurer 126, the example renderer 128, the example app instructor 130, and/or the example feedback processor 132 are hereby expressly defined to include a computer readable medium such as a memory, DVD, CD, etc. storing the software and/or firmware. Further still, the example context engine 106 may include one or more elements, processes and/or devices in addition to, or instead of, those illustrated in FIG. 1, and/or may include more than one of any or all of the illustrated elements, processes and devices.

Figure 2:
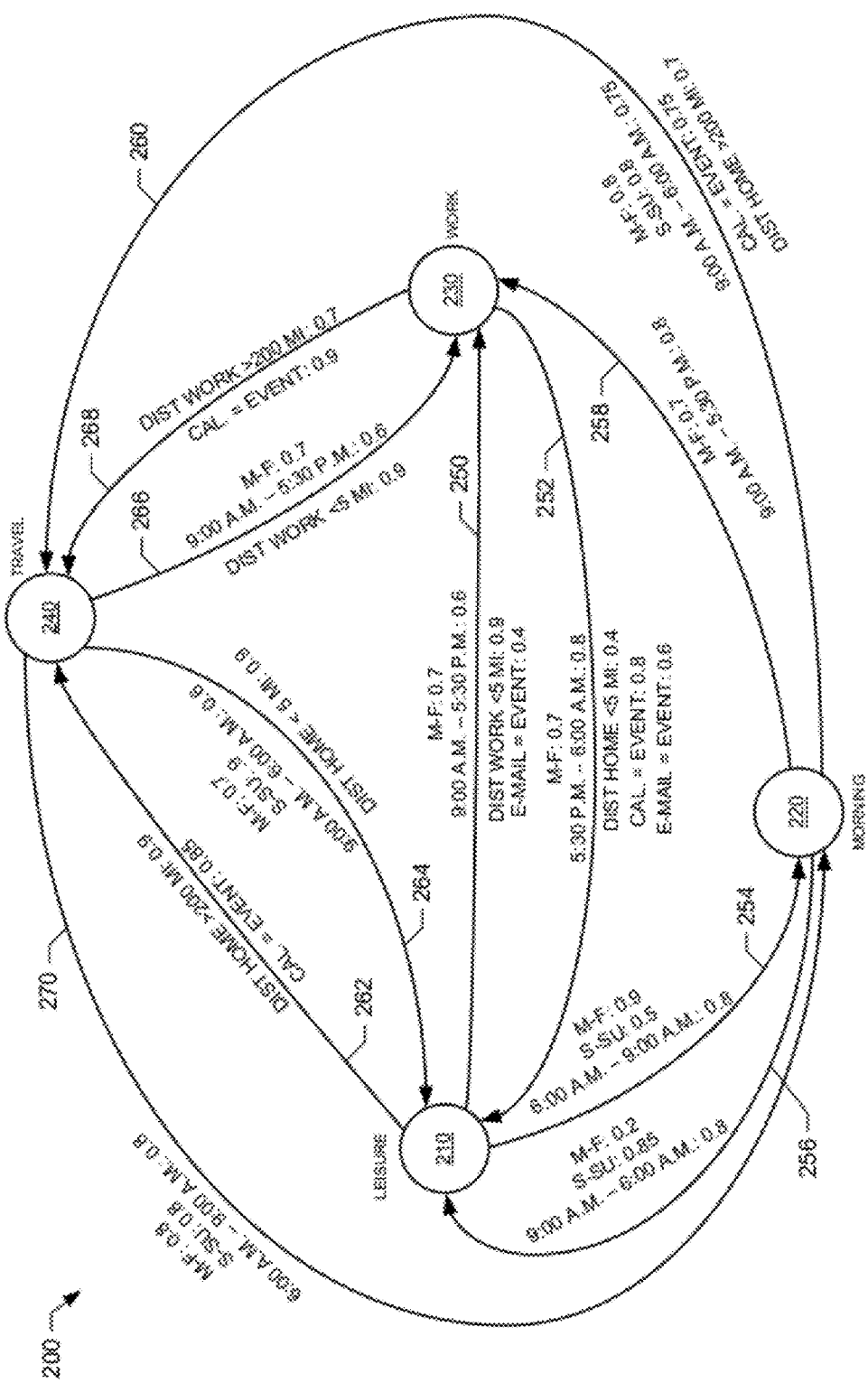
FIG. 2 shows an example rule diagram that represents how the example context engine of FIG. 1 determines between displaying contexts.

FIG. 2 shows an example rule diagram 200 that represents how the context engine 106 of FIG. 1 determines between displaying contexts 210-240. The example rule diagram 200 includes states associated with the leisure context 210, the morning context 220, the work context 230 and the travel context 240. In other examples, the context engine 106 may implement other types of rule and/or state diagrams that have additional or fewer contexts. In this example, the context engine 106, and more specifically, the context selector 122 utilizes the rule diagram 200 to determine when the contexts 210-240 are to be displayed based on a currently displayed context 210-240. In this manner, the example rule diagram 200 provides a framework for the context engine 106 to display the context 210-240 that matches an environment of a user.

The example rule diagram 200 of the illustrated example includes context transitions 250-270 that specify when the context engine 106 is to change from one context to another context. The example context transitions 250-270 are based on rules and/or definitions that are specified by a user when the use creates the contexts 210-240. Additionally, the context transitions 250-270 include weights (e.g., probabilities or likelihoods) for each of the rules. For example, the context transition 250 includes a day of the week rule (e.g., 'M-F') with a 0.7 weight, a time rule (e.g., '9:00 A.M.-5:30 P.M.) with a 0.6 weight, a geographic location rule (e.g., 'Dist Work<5 MI (miles)) with a 0.9 weight, and an event rule (e.g., 'E-mail=Event') with a 0.4 weight. In this example, the context engine 106 replaces the leisure context 210 with the work context 230 when device platform information and/or application information match the rules specified for the context transition 250.

The example rules and/or weights associated with the context transition 250 in addition to the rules and weights associated with the other context transitions 252-270 are shown as one example for the rule diagram 200. In other examples, the context transitions 250-270 may include additional rules, fewer rules, and/or different weights. Further, in other examples, the rule diagram 200 may include additional or fewer context transitions based on a number of rules specified by a user of the mobile device 100 of FIG. 1.

By way of an example, the context engine 106 may currently display the leisure context 210 in, for example, the mobile device 100. The context engine 106 receives device platform information and/or application information, identifies which of the contexts 210-240 can be transitioned from the leisure context 210, and accesses the rules for those contexts 210-240. In this example, the context engine 106 determines that the morning context 220, the work context 230, and the travel context 240 can be transitioned from the leisure context 210. Additionally, the context engine 106 can also continue displaying the leisure context 210. The context engine 106 examines rules for the contexts 210-240, compares the received device platform and/or application information to the rules, and calculates a total weight for each of the contexts 210-240 based on rules that match the device platform and/or application information. The context engine 106 then selects the context 210-240 with the greatest weight. Thus, in some instances, the context engine 106 may continue to display the leisure context 210, while in other instance the context engine 106 replaces the leisure context 210 with one of the other contexts 220-240.

More specifically, the context engine 106 may receive device platform information indicating a Thursday day of the week, a 3:30 P.M. time, a geographic location corresponding to a work location. The context engine 106 then determines the possible context transitions 250, 254, and 262 from the leisure context 210. The context engine 106 may also identify rules (not shown) for continuing to display the leisure context 210. Alternatively, the context engine 106 may remain displaying the leisure context 210 if the calculated weights for the context transitions 250, 254, and 262 do not exceed a predefined threshold. In this example, the context engine 106 would calculate a 2.2 weight for the context transition 250 based on the matching rules (e.g., 'M-F', '9:00 A.M.-5:30 P.M.', and 'DIST WORK<5 MI'), a 0.9 weight for the context transition 254 (e.g., 'M-F'), and a 0.0 weight for the context transition 262. Additionally, the context engine 106 may calculate a 1.5 weight (e.g., 'M-F' with a 0.7 weight and '9:00 A.M.-5:30 P.M.' with a 0.8 weight) for continuing to display the leisure context 210. Because the calculated 2.2 weight for the context transition 250 is greater than the calculated 1.5 weight for continuing to display the leisure context 210, the example context engine 106 replaces the display of the leisure context with the work context 230.

The example context engine 106 may then receive new device platform and/or application information and calculate weights for the context transitions 258 and 268 as well as a weight for continuing to display the work context 230. Additionally, if the context engine 106 displays the work context 230 and receives feedback that a user subsequently manually changed back to the leisure context 210, the context engine 106 may reduce the weights of the rules associated with the context transition 250 based on the current device platform and/or application information. For example, the context engine may reduce the 'M-F' rule weight from 0.7 to 0.65, the '9:00 A.M.-5:30 P.M.' rule weight from 0.6 to 0.55, and the "DIST WORK<5 MI' rule weight from 0.9 to 0.85. However, because the context engine 106 did not receive any event information, the context engine 106 does not modify the 'E-mail=Event' rule for the context transition 250.

FIGS. 3-6 show the example contexts of 210-240 of FIG. 2. While the contexts 210-240 include some features, functions, and/or applications, the example contexts 210 may include other features, functions, and/or applications not shown. Additionally, the example contexts 210-240 may include features, functions, and/or applications that are not shown but may be navigated to by a user by using a sliding and/or scrolling function of the mobile device 100.

Figure 3:
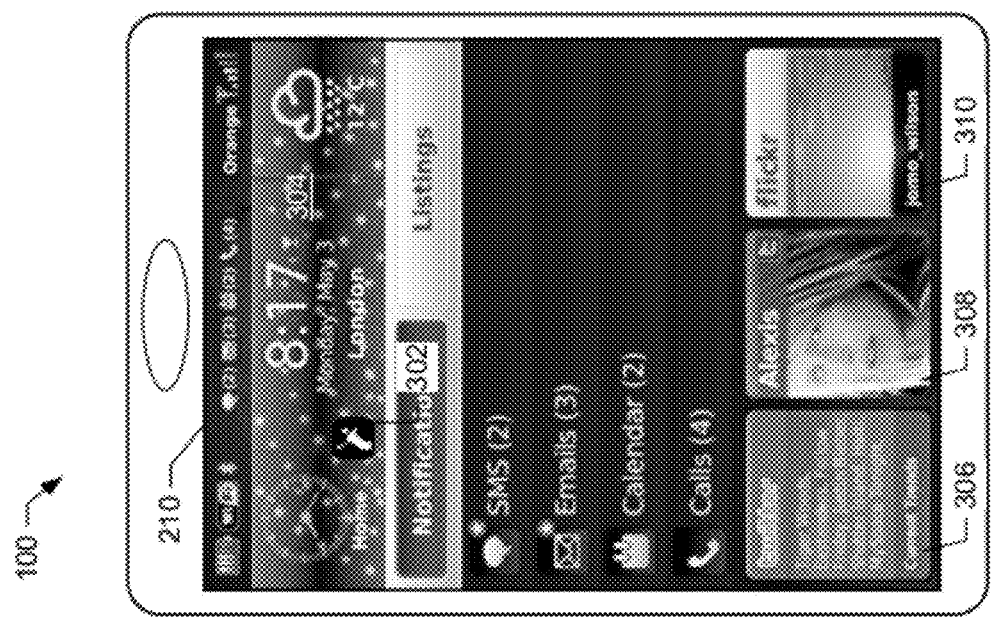

FIG. 3 shows the example leisure context 210, which includes a leisure icon 302 to indicate to a user that the mobile device 100 is displaying the leisure context 210. The leisure icon 302 shows one example graphical image that may be displayed to indicate the leisure context 210 to a user. In other examples, the leisure icon 302 can include text, a picture, an animation, a sound, and/or any other type of indictor. Additionally, a background 304 behind the leisure icon 302 displays an image associated with the leisure context 210. Further, the leisure context 210 includes a social messaging application 306, a following of Alexis on a social messaging application 308, and a photograph application 310. In this example, the context engine 106 uses a file that describes how the leisure context 210 is to display the leisure icon 302, the background 304, and the applications 306-310.

Figure 4:
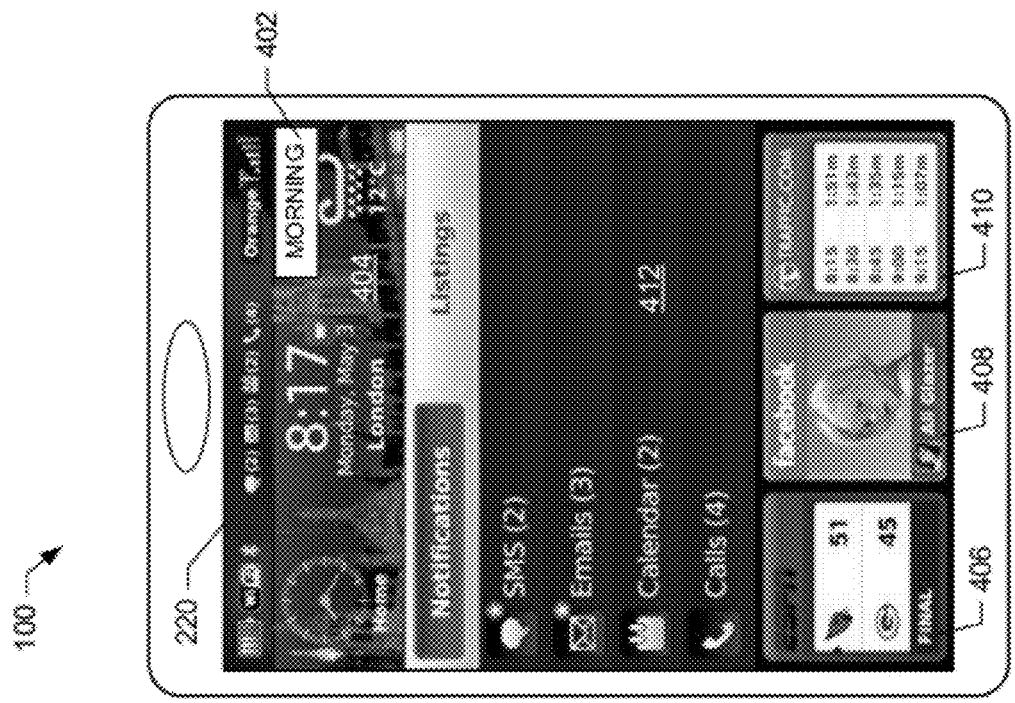
FIGS. 3-6 show the example contexts of FIG. 2.

FIG. 4 shows the example morning context 220 that is displayed by the context engine 106 using the rule diagram 200 of FIG. 2. The morning context 220 includes a morning icon 402 to indicate to a user that the mobile device 100 is displaying the morning context 220. Additionally, a background 404 behind the morning icon 402 includes an image selected by a user to be displayed within the morning context 220. Further, the morning context 220 includes a sports application 406, a social networking application 408, and a traffic application 310. In this example, the context engine 106 uses instructions within a morning context file to display the morning icon 402, the background 404, and the applications 406-410. The morning context file may also describe features and/or functions 412 associated with, for example, the mobile device 100 that are to be displayed within the morning context 220.

Figure 5:
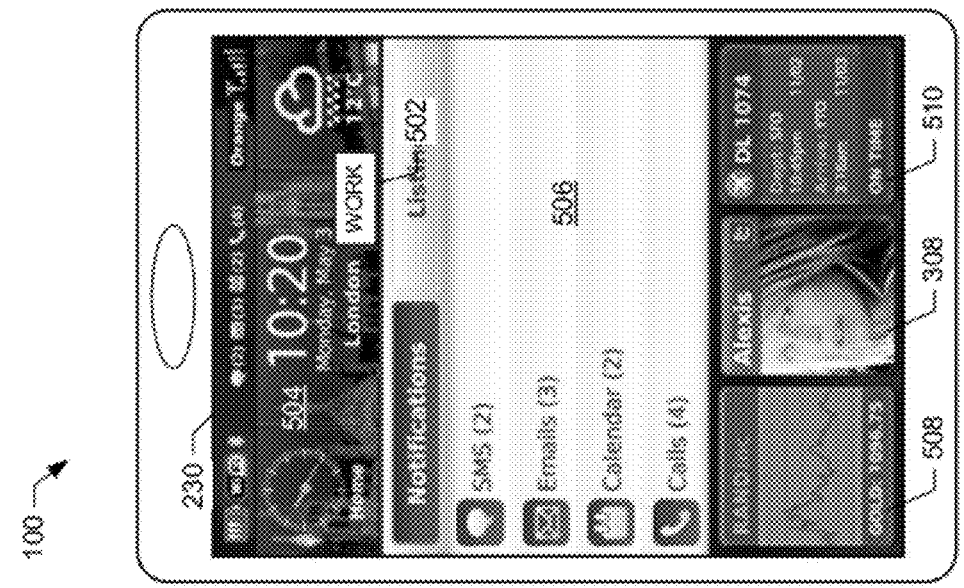

FIG. 5 shows the example work context 230 of FIG. 2 that is displayed by the context engine 106 using the rule diagram 200. The work context 230 includes a work icon 502 to indicate to a user that the mobile device 100 is displaying the work context 230. Additionally, a background 504 behind the work icon 502 includes an image selected by a user to be displayed within the work context 230. The work context 230 also includes features and/or functions 506 of the mobile device 100. In the illustrated example, a work context file may specify that a display of the features and/or functions 506 is to have relatively light shading compared to the relatively dark shading of the features and/or functions 412 of the morning context 220 of FIG. 4.

Additionally, the work context 230 includes a stock tracking application 508, the following of Alexis on the social messaging application 308, and a flight information application 510. In this example, the context engine 106 utilizes the work context file to display the work icon 502, the background 504, the features and/or functions 506, and the applications 508, 308, and 510.

Figure 6:
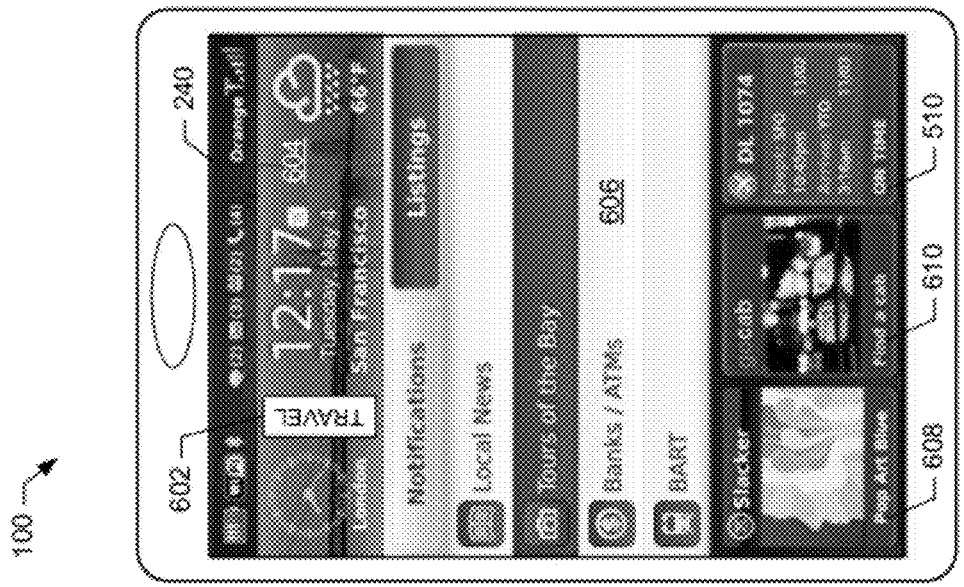

FIG. 6 shows the example travel context 240 of FIG. 2 that is displayed by the context engine 106 using the rule diagram 200. The travel context 240 includes a travel icon 602 to indicate to a user that the mobile device 100 is displaying the travel context 240. Additionally, a background 604 displayed behind the travel icon 602 includes an image selected by a user to be displayed within the travel context 240. In this example, a user may select to view features and/or functions 606 associated with traveling to a detected geographic location of San Francisco, Calif. The travel features and/or functions 606 include local news, tours of San Francisco Bay, banks and/or ATMs in San Francisco, and train schedules for the Bay Area Rapid Transit (BART).

Additionally, the work context 240 of FIG. 6 includes a music streaming application 608, a taxi cab locating application 610, and the flight information application 510. In this example, the context engine 106 utilizes a travel context file to display the travel icon 602, the background 604, the features and/or functions 606, and the applications 608, 610, and 510.

Figure 7:
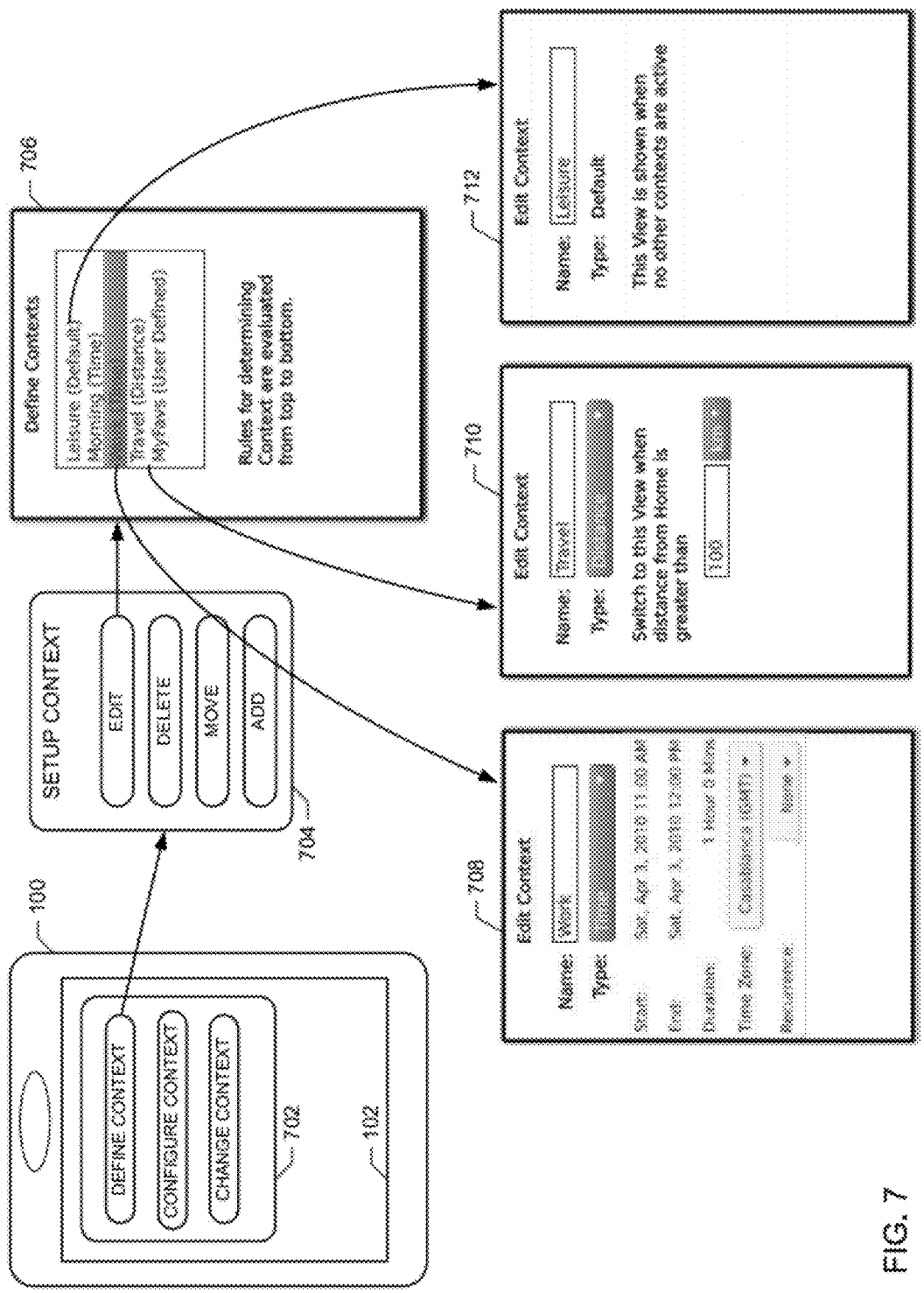
FIG. 7 shows example menus that the context engine displays to enable a user of the mobile device to configure the contexts of FIGS. 2-6.

FIG. 7 shows example menus 702-712 that the context engine 106 displays to enable a user of the mobile device 100 to configure the contexts 210-240 of FIGS. 2-6. The example menus 702-712 may be used to define the rules, transitions, and/or mapping shown in conjunction with the rule diagram 200 of FIG. 2. In the illustrated example, a user, via the user interface 102, requests to view the context menu 702. The example context menu 702 includes options for a user to create and/or modify a context (e.g., 'Define Context)', select which features, functions, and/or applications are to be displayed for each context (e.g., 'Configure Context'), and select a different context to display within the user interface 102 (e.g., 'Change Context'). In other examples, the context menu 702 may include additional or fewer options.

In the example of FIG. 7, a user selects the 'Define Context' option, thereby causing the context engine 106 (e.g., the context configurer 126) to display the configuration menu 704. The example configuration menu 704 provides options for a user to modify and/or change an already created context (e.g., 'Edit'), remove a context from the context library 124 (e.g., 'Delete'), modify a location of a context within the user interface 102 (e.g., 'Move'), and create a context (e.g., 'Add'). In this example, a user selects the 'Edit' option, thereby causing the context engine 106 to display the context selection menu 706.

The example context selection menu 706 enables a user to select and modify one of the listed contexts (e.g., the leisure context 210, the morning context 220, the work context 230, and the travel context 240) stored in the context library 124. Additionally, the context selection menu 706 includes a 'MyFavs' context that may include favorite features, functions, and/or applications of a user. In other examples, the context selection menu 706 may include additional or fewer contexts. The context selection menu 706 may also include default contexts configured by, for example, a manufacturer and/or a developer of the mobile device 100.

In this example, a user may select the work context 230 (e.g., 'Work(Time)'), thereby causing the context engine 106 to display the work context menu 708. The example work context menu 708 displays rules specified by a user that define when the work context 230 is to be displayed. In this example, the work context menu 708 includes a context identifier field (e.g., 'Name:') and a rule type field (e.g., 'Type') that is used by the context engine 106 to organize rules within a context file. By a user selecting 'Time' within the rule type field, the context engine 106 displays time rules including, for example, a start time for displaying the work context 230 (e.g., 'Start:'), an end time for displaying the work context 230 (e.g., 'End:'), a duration time for displaying the work context 230 (e.g., 'Duration:'), a time zone (e.g., 'Time Zone: '), and a recurrence event (e.g., 'Recurrence:'). Further, each of the rules may include a weight that can be modified by a user.

While the work context menu 708 includes some rules, the work context menu 708 and/or other context menus (e.g., the context menus 710 and 712) may include additional rules or fewer rules. For example, the work context menu 708 may also include a key words rule that lists words that the context engine 106 uses to search application information to determine if, for example, a calendar event or an e-mail is associated with the work context 230. In another example, the work context menu 708 may include a rule that includes a physical and/or electronic address of a work location of a user.

In the example of FIG. 7, a user may select the travel context 240 from the context selection menu 706 (e.g., 'Travel(Distance)'), thereby causing the context engine 106 to display the travel context menu 710. The example work context menu 710 displays a distance rule specified by a user to define when the travel context 240 is to be displayed. In this example, a user specifies, via the work context menu 708, that the travel context 240 is to be displayed when the context engine 106 detects that the mobile device 100 is more than 100 kilometers (km) from a home physical and/or electronic address.

Additionally, a user may select the leisure context 210 from the context selection menu 706 (e.g., 'Leisure(Default)'), thereby causing the context engine 106 to display the leisure context menu 710. In this example, a user selects the leisure context 210 to be displayed as a default context. Selecting a default context option may cause the context engine 106 to assign a weight threshold to the leisure context 712. Thus, the context engine 106 will only display one of the other contexts 220-240 if a respective calculated weight exceeds the weight threshold of the default leisure context 210. In other examples, a user may specify rules for displaying the leisure context 712.

Figure 9:
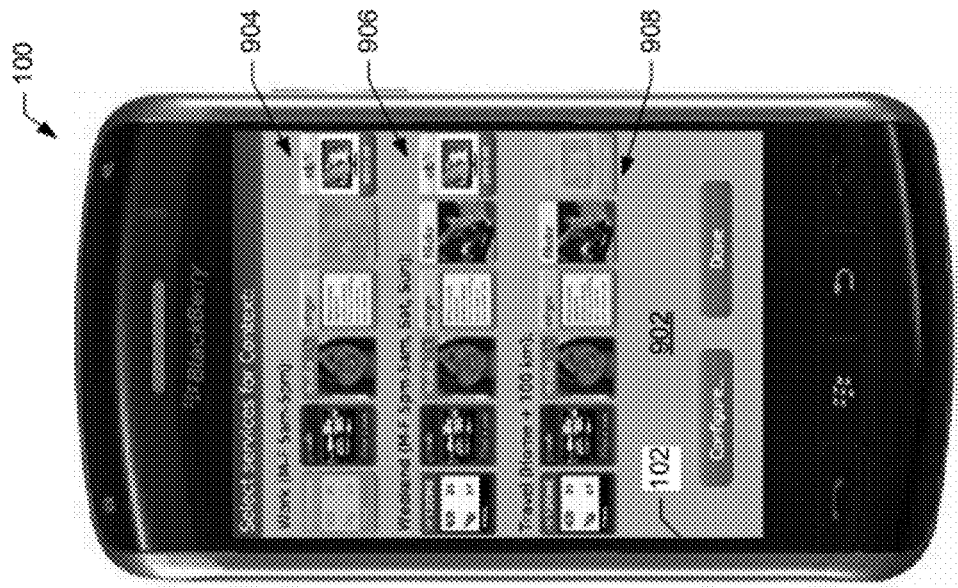
FIGS. 8 and 9 show example menus that the example context engine displays to enable a user of a mobile device to configure applications to display within the contexts of FIGS. 2-6.
Figure 8:
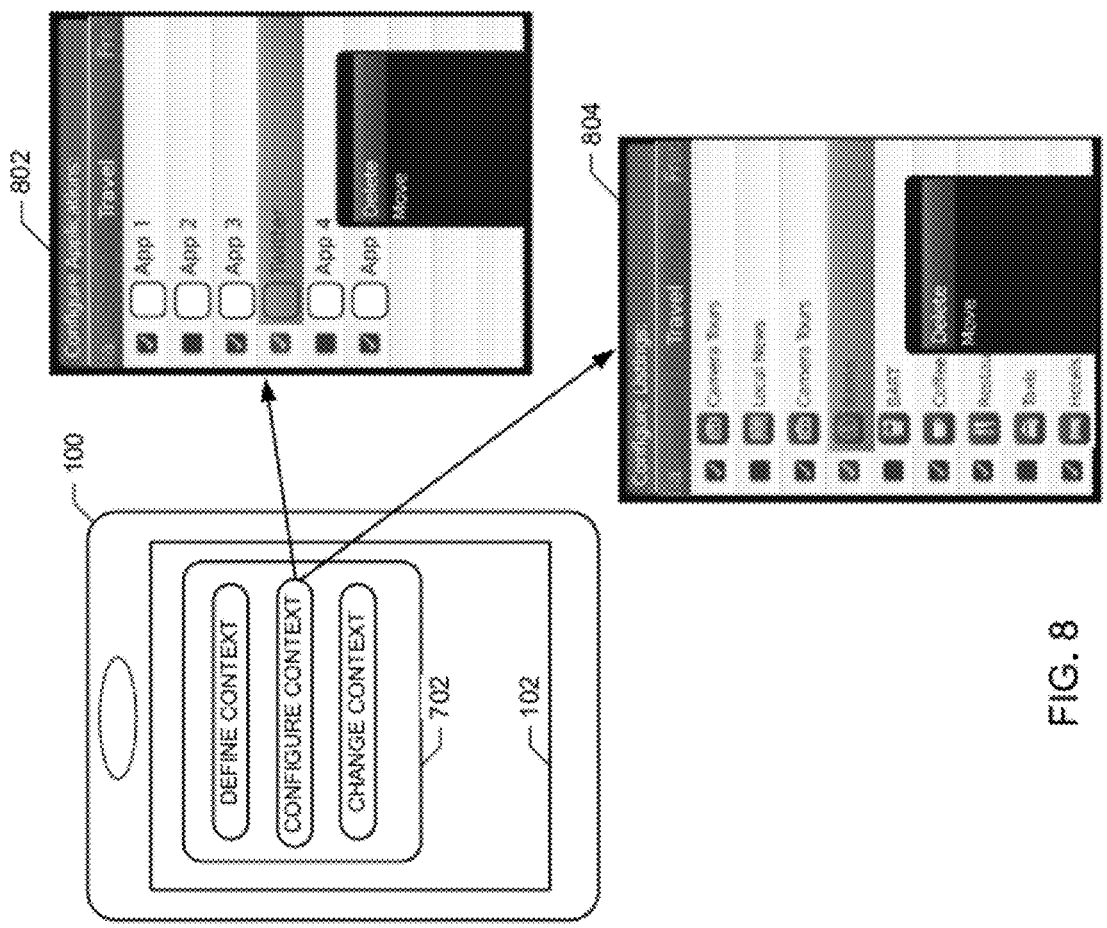

FIGS. 8 and 9 show example menus 702, 802, 804, and 902 that the context engine 106 displays to enable a user of the mobile device 100 to configure applications, features, and/or functions to display within the contexts 210-240 of FIGS. 2-6. In this example, a user selects the 'Configure Context' option within the context menu 702, causing the context configurer 126 to display the application configuration menu 802 and the features/functions menu 804. In other examples, the menus 802 and 804 may include additional options for selecting and/or configuring applications, features, and/or functions.

In the illustrated example, a user utilizes the application configuration menu 802 to select which applications are to be displayed within the travel context 240. A user may change the context by scrolling to the left or right of the user interface 102. The features/functions menu 804 enables a user to select which features and/or functions of the mobile device 100 are to be displayed within the travel context 240. By selecting applications, features and/or functions via the menus 802 and 804, the context configurer 126 stores the selections to a travel context file for the travel context 210.

FIG. 9 displays the application selection menu 902 that is similar to the application configuration menu 802 of FIG. 8. In the example of FIG. 9, a user concurrently views which applications are enabled for the work context 230 via a work context menu 904, the leisure context 210 via a weekend context menu 906, and the travel context 240 via a travel context menu 908. A user may select to display an application within a context by highlighting and/or selecting a pictorial icon representing the application within the user interface 102.

Figure 10A:
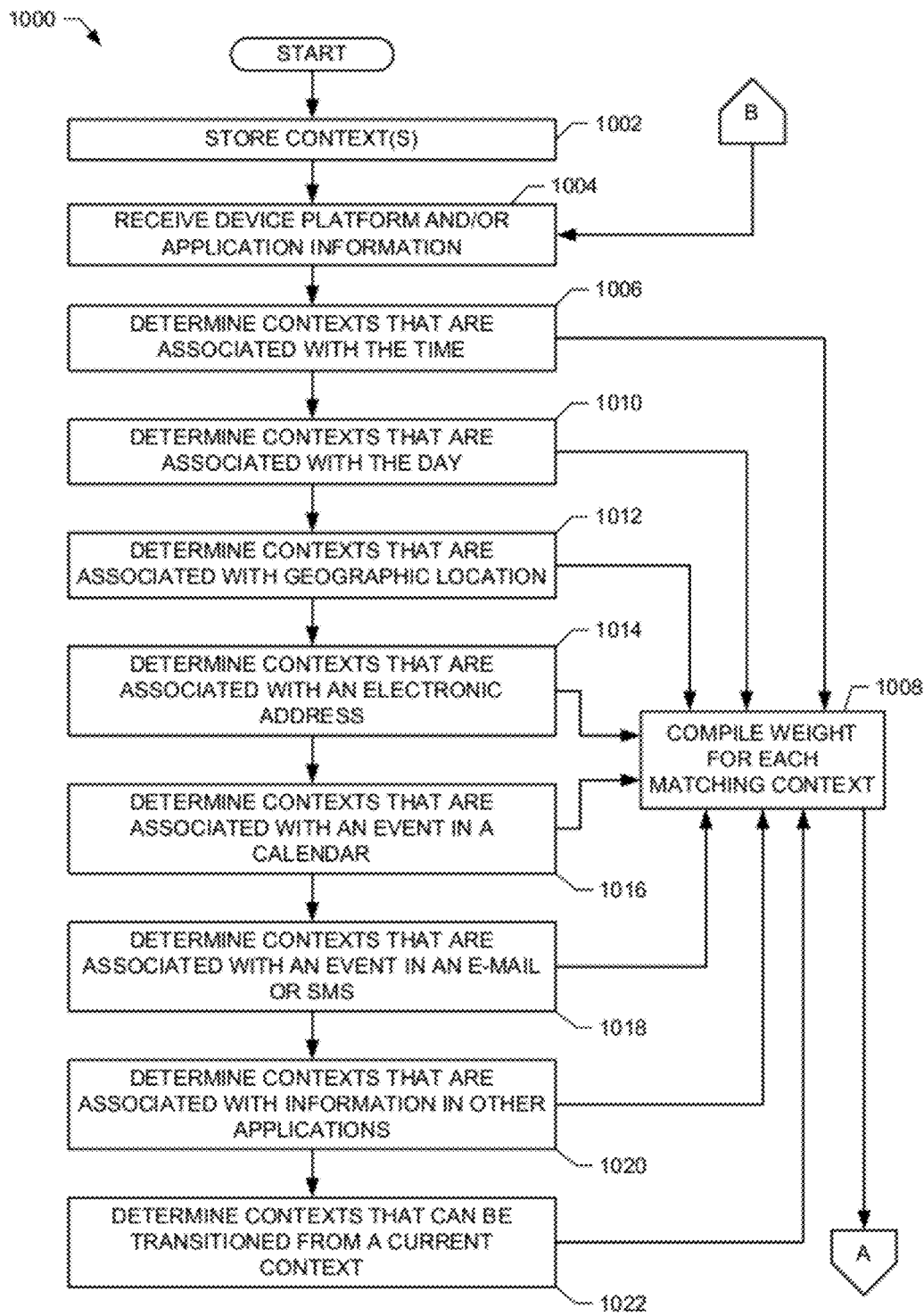
FIGS. 10A and 10B are a flowchart of example processes that may be used to implement the context engine of FIG. 1.
Figure 10B:
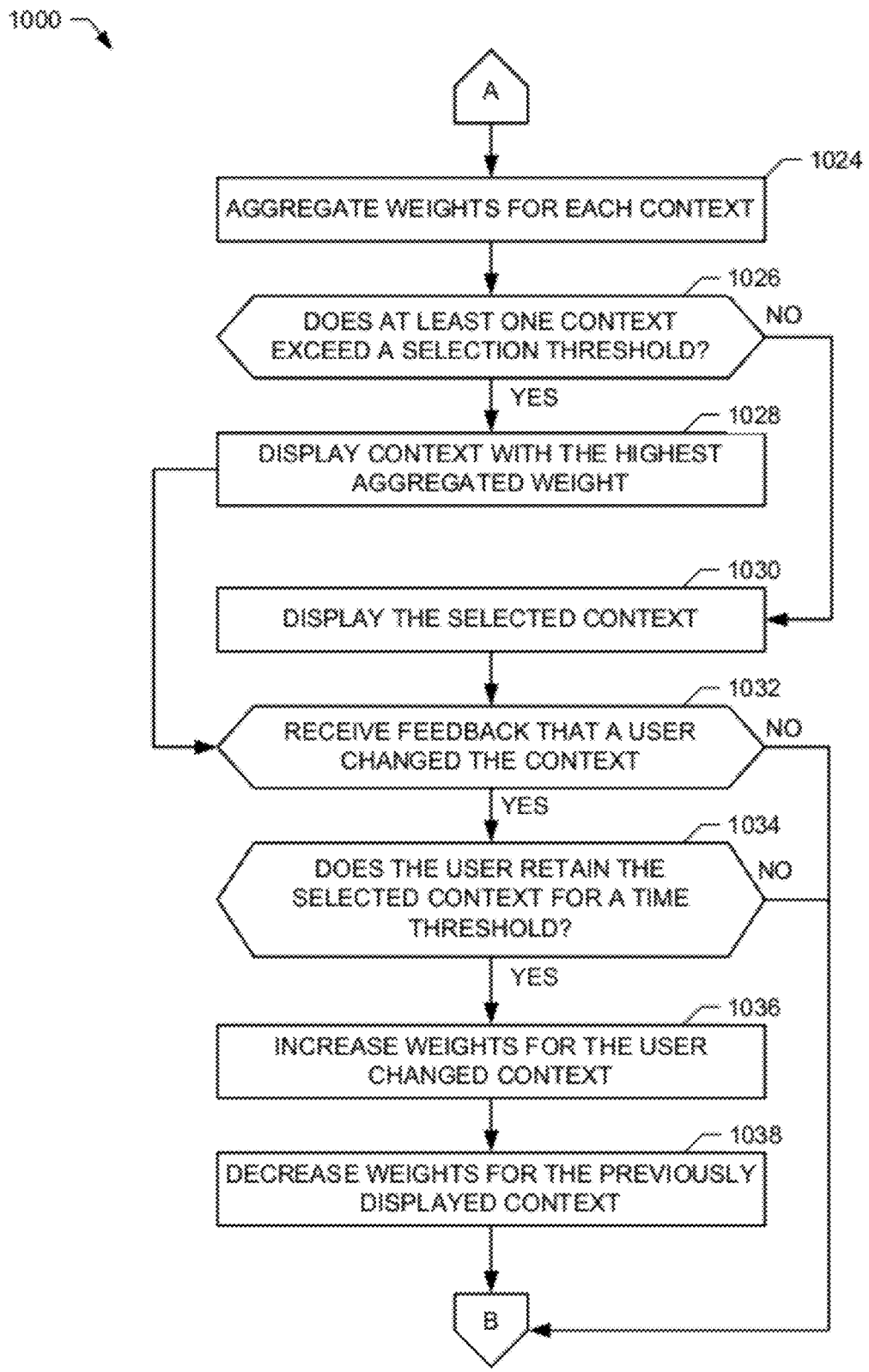

A flowchart representative of an example process 1000 for implementing the context engine 106 of FIG. 1 is shown in FIGS. 10A and 10B. In this example, the process 1000 may be implemented using the machine readable instructions in the form of a program for execution by a processor such as the processor 1112 shown in the example processor system 1100 discussed below in connection with FIG. 11. The program may be embodied in software stored on a computer readable medium such as a CD-ROM, a floppy disk, a hard drive, a digital versatile disk (DVD), or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIGS. 10A and 10B, many other methods of implementing the example context engine 106 may alternatively be used. For example, the order of execution of the blocks may be changed, and/or some of the blocks described may be changed, eliminated, or combined.

As mentioned above, the example process 1000 of FIGS. 10A and 10B may be implemented using coded instructions (e.g., computer readable instructions) stored on a tangible computer readable medium such as a hard disk drive, a flash memory, a ROM, a CD, a digital versatile disk (DVD), a cache, a RAM and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage. Additionally or alternatively, the example process 1000 of FIGS. 10A and 10B may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporary buffering, and/or for caching of the information). As used herein, the term non-transitory computer readable medium is expressly defined to include any type of computer readable medium.

The example process 1000 of FIGS. 10A and 10B displays a context (e.g., the contexts 210-240 of FIGS. 2-7) based on detected device platform and/or application information. While FIG. 10A shows one routine for calculating a total weight for a context based on matching device platform and/or application information, the order of the blocks 1006-1022 may be rearranged, combined, and/or further partitioned to calculate a total weight for a context. In other examples, the process 1000 may select a context based on probabilities and/or a likelihood that a user desires to view a context.

The example process 1000 of FIG. 10A begins by storing and/or creating one or more contexts in a mobile device (e.g., via the context configurer 126) (block 1002). The example process 1000 next receives device platform information and/or application information (e.g., via the platform compiler 108 and/or the receivers 110-120) (block 1004). The example process 1000 then determines which of the stored contexts is to be displayed within a user interface of the mobile device (e.g., via the context selector 122) (block 1006-1022). To determine which context is to be displayed, the example process 1000 determines which contexts have a rule that matches a current time (e.g., via the day/time receiver 110, the platform compiler 108, and/or the content selector 122) (block 1006) and compiles weights for each context associated with the matching rule (e.g., via the context selector 122) (block 1008). The example process 1000 next determines which of the contexts have a rule that matches a current day (e.g., via the day/time receiver 110, the platform compiler 108, and/or the content selector 122) (block 1010) and compiles weights for each context associated with the matching rule (e.g., via the context selector 122) (block 1008). The example process 1000 then determines which of the contexts have a rule that matches a detected geographic location of the mobile device (e.g., via the geographic location receiver 112, the platform compiler 108, and/or the content selector 122) (block 1012) and compiles weights for each context associated with the matching rule (e.g., via the context selector 122) (block 1008).

The example process 1000 also determines which of the contexts have a rule that matches a detected electronic address of the mobile device and/or any associated wireless networking equipment within proximity of the mobile device (e.g., via the electronic address receiver 114, the platform compiler 108, and/or the content selector 122) (block 1014) and compiles weights for each context associated with the matching rule (e.g., via the context selector 122) (block 1008). The example process 1000 further determines which of the contexts have a rule that matches a calendar event (e.g., via the calendar receiver 118, the platform compiler 108, and/or the content selector 122) (block 1016) and compiles weights for each context associated with the matching rule (e.g., via the context selector 122) (block 1008). The example process 1000 next determines which of the contexts have a rule that matches an event specified within an e-mail or SMS (e.g., via the SMS/e-mail receiver 116, the platform compiler 108, and/or the content selector 122) (block 1018) and compiles weights for each context associated with the matching rule (e.g., via the context selector 122) (block 1008).

The example process 1000 then determines which of the contexts have a rule that matches information in other features, functions, and/or applications of the mobile device (e.g., via the app data receiver 120, the platform compiler 108, and/or the content selector 122) (block 1020) and compiles weights for each context associated with the matching rule (e.g., via the context selector 122) (block 1008). The example process 100 may also determine which of the contexts can be selected based on a currently displayed context using, for example, the rule diagram 200 of FIG. 2 (e.g., via the context selector 122) (block 1022).

The example process 1000 of FIG. 10B continues by aggregating weights for each of the contexts to calculate a total weight for each context (e.g., via the context selector 122) (block 1024). The example process 1000 then determines if one or more of the total weights of the contexts exceeds a predetermined threshold (e.g., via the context selector 122) (block 1026). If there is at least one context with a total weight above a threshold, the example process 1000 selects and displays the context with the greatest weight (e.g., via the context selector 122 and/or the renderer 128) (block 1028). Alternatively, the example process 1000 may combine portions of the contexts with weights above the threshold into a single displayed context. However, if none of the total weights of the contexts exceeds the threshold, the example process 1000 selects and displays the context with the greatest weight (e.g., via the context selector 122 and/or the renderer 128) (block 1030). In other examples, the example process 1000 determines to continue displaying a currently displayed context if the total weights of the other contexts do not exceed a threshold.

The example process 1000 then determines if a user has changed a displayed context (e.g., via the feedback processor 132) (block 1032). If a user has switched to a different context, the example process 100 determines if the user continues to display the newly selected context for a time that exceeds a predetermined time threshold (e.g., via the feedback processor 132) (block 1034). If the user does continue to display the newly selected context, the example process increases weights of rules associated with the newly selected context that match current device platform and/or application information and decreases weights of rules associated with the previously displayed context that match current device platform and/or application information (e.g., via the feedback processor 132) (blocks 1036 and 1038). The example process 1000 then returns to block 1004 and determines a context that is to be displayed based on any newly detected device platform and/or application information.

Figure 11:
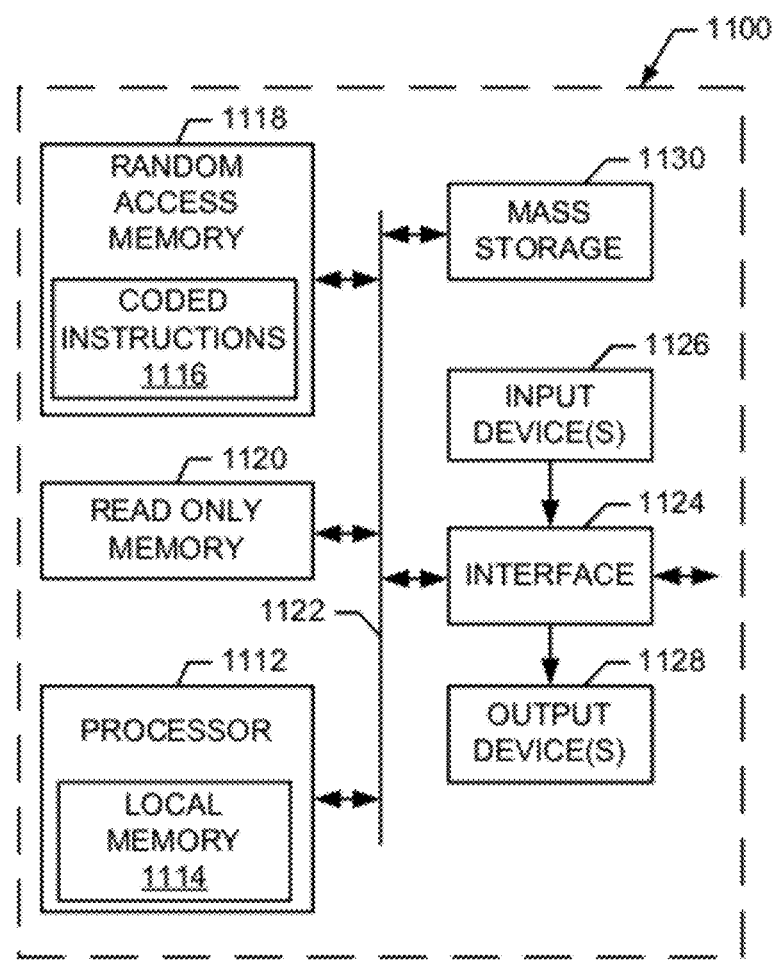
FIG. 11 is block diagram of an example processing system that may execute example machine readable instructions used to implement some or all of the above processes.

FIG. 11 is a block diagram of an example processing system 1100 capable of implementing the apparatus and methods disclosed herein. The processing system 1100 can be, for example, the mobile device 100, the context engine 106, the platform compiler 108, the context selector 122, the context configurer 126, the app instructor 130, and/or the feedback processor 132.

The system 1100 of the instant example includes a processor 1112 such as a general purpose programmable processor. The processor 1112 includes a local memory 1114, and executes coded instructions 1116 present in the local memory 1114 and/or in another memory device. The processor 1112 may execute, among other things, machine readable instructions to implement the processes represented in FIGS. 10A and/or 10B. The processor 1112 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors, one or more microcontrollers from the ARM® family of microcontrollers, the PIC® family of microcontrollers, etc. Of course, other processors from other families are also appropriate.

The processor 1112 is in communication with a main memory including a volatile memory 1118 and a non-volatile memory 1120 via a bus 1122. The volatile memory 1118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1120 may be implemented by flash memory and/or any other desired type of memory device. Access to the main memory 1118, 1120 is typically controlled by a memory controller (not shown).

The processing system 1100 also includes an interface circuit 1124. The interface circuit 1124 may be implemented by any type of interface standard, such as an Ethernet interface, a universal serial bus (USB), and/or a third generation input/output (3GIO) interface.

One or more input devices 1126 are connected to the interface circuit 1124. The input device(s) 1126 permit a user to enter data and commands into the processor 1112 (e.g., via the user interface 102). The input device(s) can be implemented by, for example, a keyboard, a mouse, a touchscreen, a track-pad, a trackball, an isopoint and/or a voice recognition system.

One or more output devices 1128 are also connected to the interface circuit 1124. The output devices 1128 can be implemented, for example, by display devices (e.g., a liquid crystal display, and/or by speakers. The interface circuit 1124, thus, typically includes a graphics driver circuit.

The interface circuit 1124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1100 also includes one or more mass storage devices 1130 for storing software and data. Examples of such mass storage devices 1130 include hard drive disks, compact disk drives and digital versatile disk (DVD) drives.

As an alternative to implementing the methods and/or apparatus described herein in a system such as the processing system of FIG. 11, the methods and or apparatus described herein may be embedded in a structure such as a processor and/or an ASIC.

What is claimed is:

1. A method to display mobile device contexts, the method comprising:
storing a first arrangement of information, graphics, and application icons as a first stored context, the first arrangement being defined via a user interface of a mobile device;
storing a second arrangement of information, graphics, and application icons as a second stored context, the second arrangement being defined via the user interface and being different than the first arrangement;
displaying the first stored context in the user interface of the mobile device based on first device platform information;
determining that second device platform information received after the first device platform information corresponds to the second stored context;
displaying the second stored context in the user interface replacing the first stored context without prompting a user of the mobile device;
receiving feedback that the first stored context was manually selected to replace the second stored context displayed via the user interface subsequent to displaying the second stored context;
reducing the correspondence between the second stored context and the second device platform information in response to the feedback; and
increasing the correspondence between the first stored context and the second device platform information in response to the feedback.

2. A method as defined in claim 1, wherein the first device platform information includes first application information and the second device platform information includes second application information.

3. A method as defined in claim 1, further comprising:
determining a first weight for the first stored context based on the first platform device information matching first rules specifying conditions when to display the first stored context;
determining a second weight for the second stored context based on the first platform device information matching second rules specifying conditions when to display the second stored context; and
displaying the first stored context based on the first weight being greater than the second weight.

4. A method as defined in claim 1, further comprising:
determining a first weight for the first stored context based on the second platform device information matching first rules specifying conditions when to display the first stored context;
determining a second weight for the second stored context based on the second platform device information matching second rules specifying conditions when to display the second stored context; and
displaying the second stored context based on the second weight being greater than the first weight.

5. A method as defined in claim 1, further comprising:
   determining a first weight for the first stored context based on the second platform device information matching first rules specifying conditions when to display the first stored context;
   determining a second weight for the second stored context based on the second platform device information matching second rules specifying conditions when to display the second stored context; and
   displaying the second stored context based on the first weight being less than a threshold and the second weight being greater than the threshold.

6. A method as defined in claim 1, further comprising selecting the second stored context to compare the second device platform information from a group of stored contexts based on a rule specifying that the second stored context can be transitioned from the first stored context.

7. A method as defined in claim 1, further comprising:
   determining if the first stored context is displayed via the user interface for at least a threshold time; and
   when the first stored context is displayed for at least the threshold time, performing at least one of:
   reducing the correspondence between the second stored context and the second device platform information; or
   increasing the correspondence between the first stored context and the second device platform information.

8. A method as defined in claim 1, wherein displaying the first context is based on rules having corresponding rule weights, displaying the second context is based on the rules and the rule weights, reducing the correspondence between the second context and the second device platform information comprises reducing a first one of the rule weights corresponding to a first one of the rules, and increasing the correspondence between the first context and the second device platform information comprises increasing a second one of the rule weights corresponding to a second one of the rules.

9. A method as defined in claim 8, wherein at least two of the rule weights correspond to a same item of the device platform information, have different values, and are associated with different ones of a plurality of contexts being a current context.

10. A method as defined in claim 1, further comprising determining a state machine comprising the first stored context, the second stored context, and a transition between the first stored context and the second stored context, wherein determining that the second device platform information corresponds to the second stored context is based on the transition.

11. A tangible computer readable storage device comprising machine readable instructions which, when executed, cause a machine to at least:
   store a first arrangement of information, graphics, and application icons as a first stored context, the first arrangement being defined via a user interface of a mobile device;
   store a second arrangement of information, graphics, and application icons as a second stored context, the second arrangement being defined via the user interface and being different than the first arrangement;
   display the first stored context in the user interface of the mobile device based on first rules of the first context matching first device platform information;
   determine that second device platform information received after the first device platform information matches the second stored context based on second rules of the second context matching the second device platform information;
   display the second stored context in the user interface without prompting a user of the mobile device;
   access feedback that the first stored context was manually selected to replace the second stored context displayed via the user interface subsequent to display of the second stored context;
   reduce the correspondence between the second stored context and the second device platform information in response to the feedback; and
   increase the correspondence between the first stored context and the second device platform information in response to the feedback.

12. A tangible storage device as defined in claim 11 storing machine readable instructions, which, when executed cause the machine to:
   determine a first weight for the first stored context based on the second platform device information matching first rules specifying conditions when to display the first stored context;
   determine a second weight for the second stored context based on the second platform device information matching second rules specifying conditions when to display the second stored context; and
   display the second stored context based on the second weight being greater than the first weight.

13. A tangible storage device as defined in claim 11 wherein the application icons included within the first stored context are selected by the user to be displayed within the first stored context and the application icons included within the second stored context are selected by the user to be displayed within the second stored context.

14. A tangible storage device as defined in claim 11 wherein the first stored context is displayed during a first time of a day and the second stored context is displayed during a second time of the day.

15. An apparatus to display mobile device contexts, the apparatus comprising:
   a context engine to:
   store a first arrangement of information, graphics, and application icons as a first stored context, the first arrangement being defined via a user interface of a mobile device;
   store a second arrangement of information, graphics, and application icons as a second stored context, the second arrangement being defined via the user interface and being different than the first arrangement;
   display the first stored context in the user interface of the mobile device based on first device platform information; and
   display the second stored context in the user interface replacing the first stored context without prompting a user of the mobile device to display the second stored context; a context selector to determine that second device platform information received after the first device platform information corresponds to the second stored context;
   a feedback processor to:
   access feedback that the first stored context was manually selected to replace the second stored context displayed via the user interface subsequent to display of the second stored context;
   reduce the correspondence between the second stored context and the second device platform information in response to the feedback; and
   increase the correspondence between the first stored context and the second device platform information in response to the feedback; and a processor to implement at least one of the context engine, the context selector, or the feedback processor.

16. An apparatus as defined in claim 15, further comprising a platform compiler to:
   determine a first weight for the first stored context based on the first platform device information matching first rules specifying conditions when to display the first stored context;
   determine a second weight for the second stored context based on the first platform device information matching second rules specifying conditions when to display the second stored context;
   determine a third weight for the first stored context based on the second platform device information matching first rules specifying conditions when to display the first stored context; and
   determine a fourth weight for the second stored context based on the second platform device information matching second rules specifying conditions when to display the second stored context.

17. An apparatus as defined in claim 16, wherein the context selector is to:
   display the first stored context based on the first weight being greater than the second weight; and
   display the second stored context based on the second weight being greater than the first weight.

18. An apparatus as defined in claim 15, further comprising an application instructor to:
   identify applications corresponding to application icons displayed within the second stored context; and
   send instructions to the identified applications to cause the applications to be operational within the second stored context, the instructions including the second device platform information.

19. An apparatus as defined in claim 18, wherein the applications use the second device platform information to display relevant application data within the second stored context.

20. An apparatus as defined in claim 15, wherein the feedback processor is to determine if the first stored context is displayed via the user interface for at least a threshold amount of time and, when the first stored context is displayed for at least the threshold amount of time, perform at least one of reducing the correspondence between the second stored context and the second device platform information or increasing the correspondence between the first stored context and the second device platform information.

* * * * *